(No Model.) 6 Sheets—Sheet 3.
R. G. HOPKINS.
MACHINE FOR INKING RIBBONS FOR TYPE WRITER MACHINES.
No. 524,276. Patented Aug. 7, 1894.

WITNESSES
INVENTOR

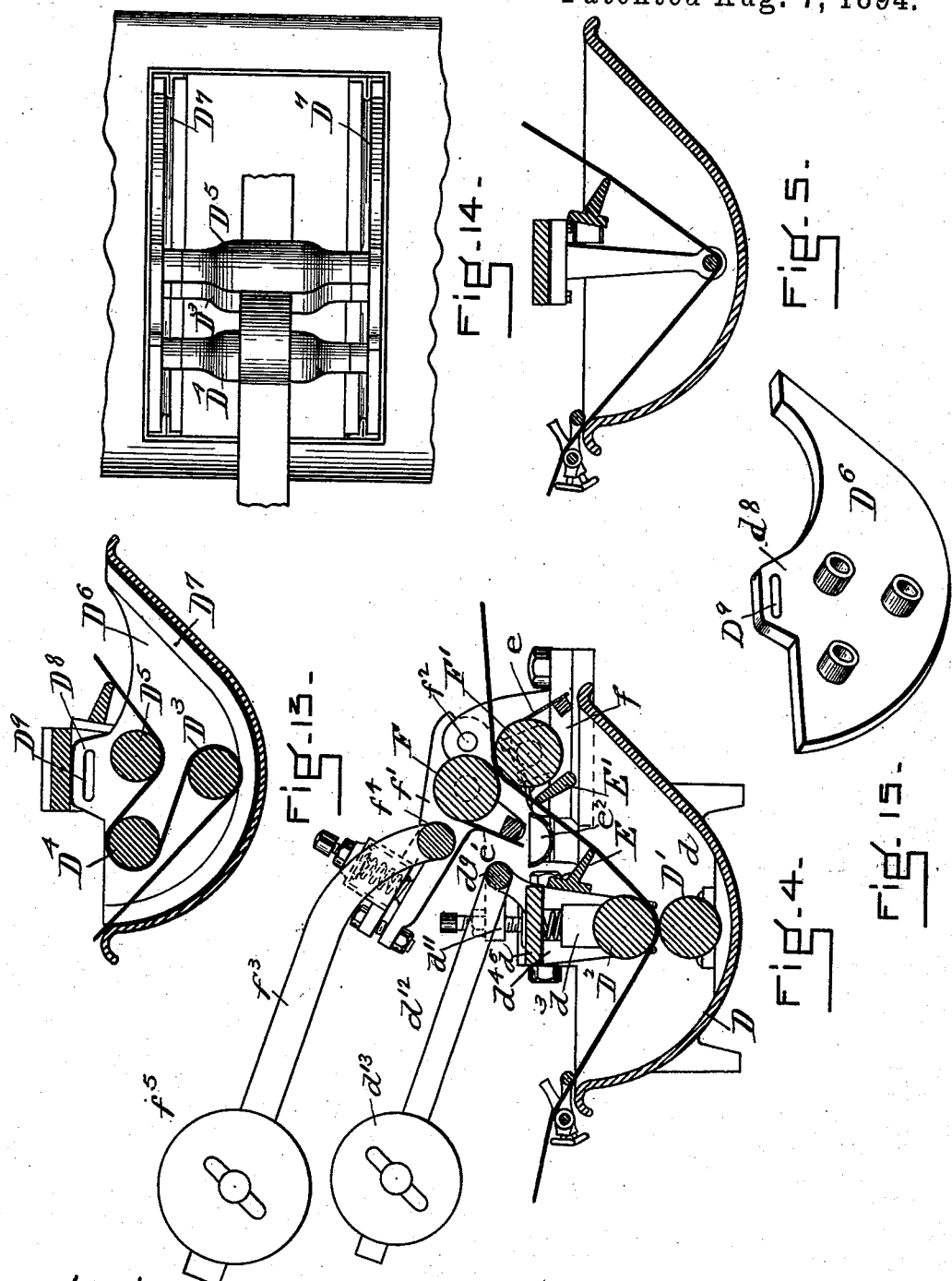

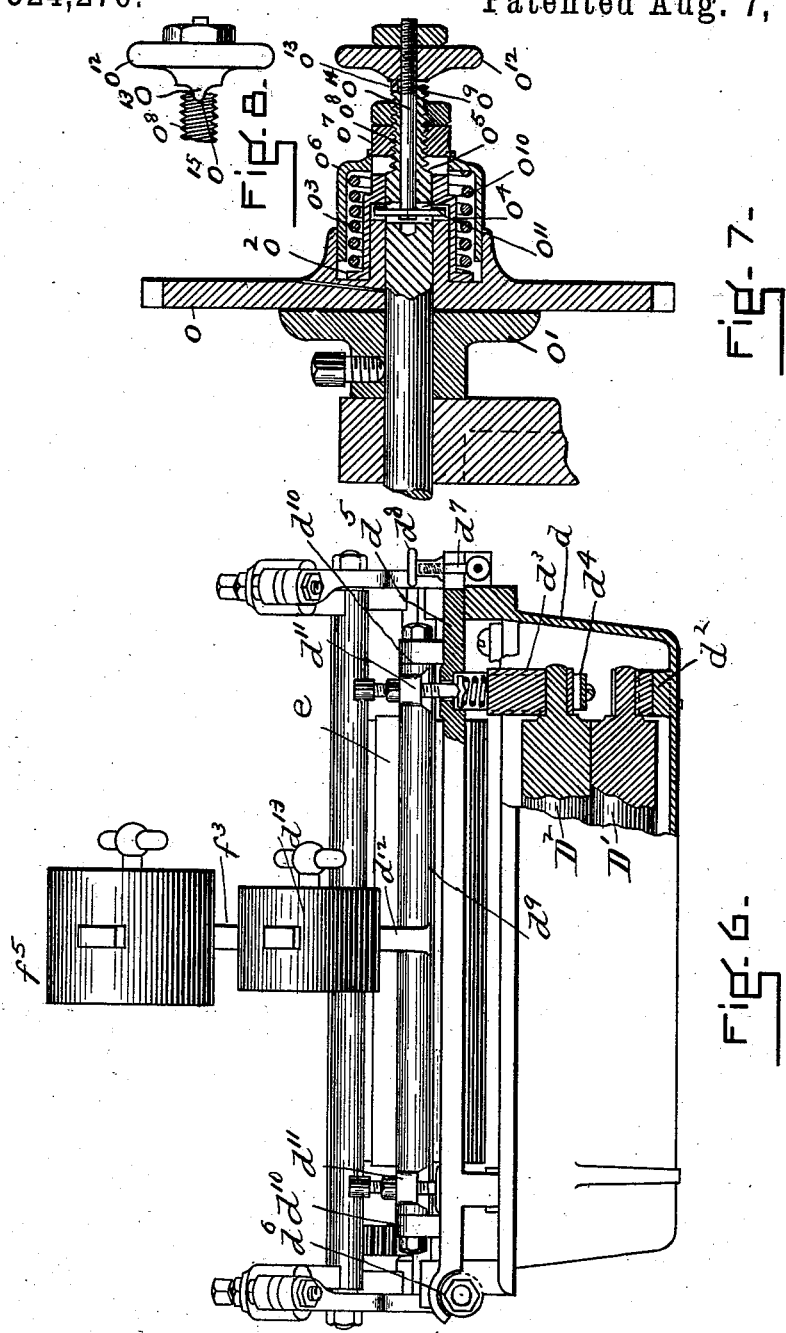

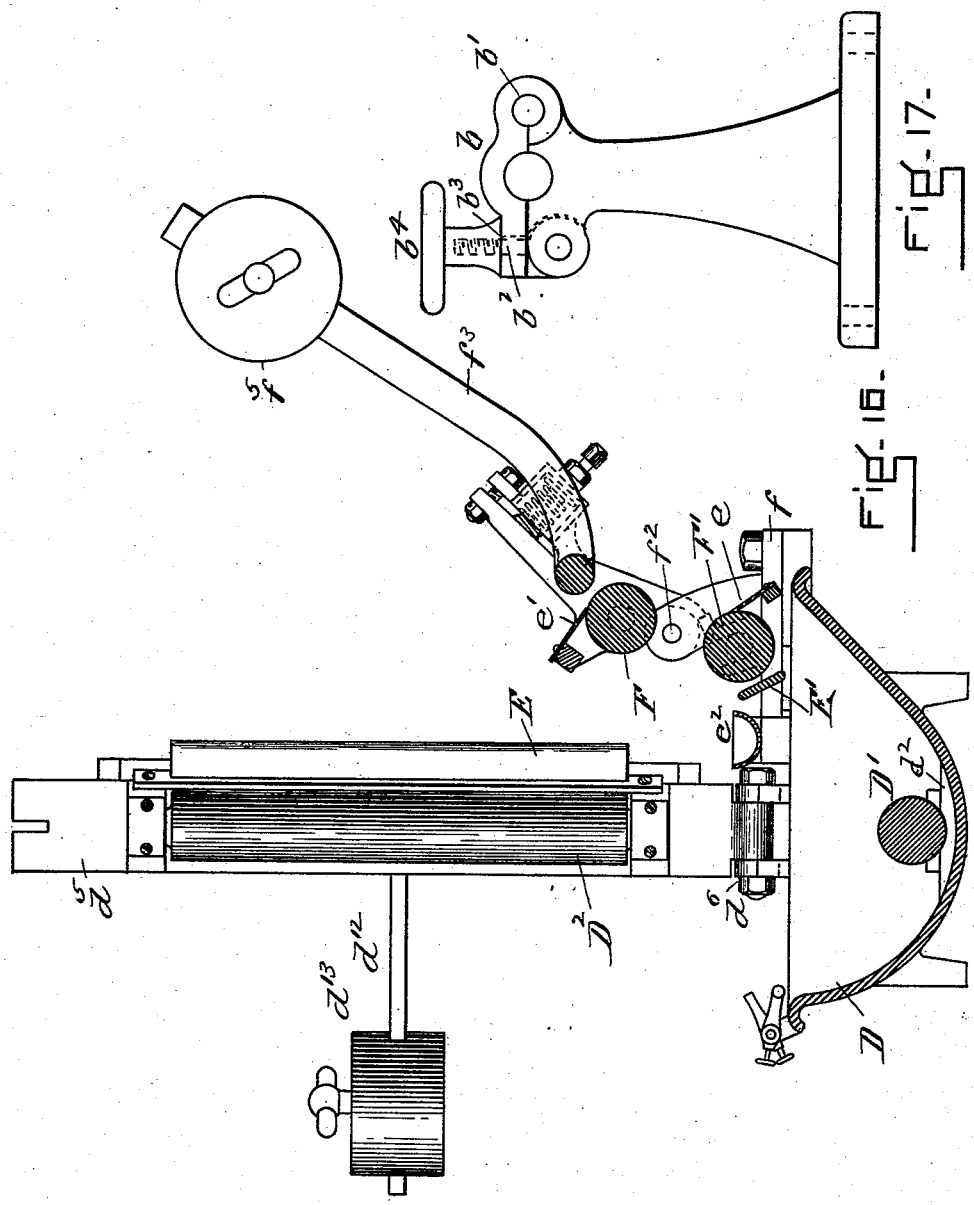

UNITED STATES PATENT OFFICE.

ROBERT G. HOPKINS, OF SOMERVILLE, ASSIGNOR TO CARTER, DINSMORE & CO., OF BOSTON, MASSACHUSETTS.

MACHINE FOR INKING RIBBONS FOR TYPE-WRITER MACHINES.

SPECIFICATION forming part of Letters Patent No. 524,276, dated August 7, 1894.

Application filed September 28, 1893. Serial No. 486,677. (No model.)

*To all whom it may concern:*

Be it known that I, ROBERT G. HOPKINS, a citizen of the United States, residing at Somerville, in the county of Middlesex and State of Massachusetts, have invented a new and useful Improvement in Machines for Inking Ribbons for Type-Writer Machines, of which the following is a full, clear, and exact description, reference being had to the accompanying drawings, forming a part of this specification, in explaining its nature.

It relates to a mechanism for automatically applying to one or more strips of material or ribbon of a width suitable for the inking ribbons of typewriting machines, the inking composition, and for the incorporating it into the interstices and fibers of the ribbon under suitable pressure, and for gaging the amount of inking composition supplied the strips or ribbon, and the pressure under which it is applied, and also for finishing the inked strips or ribbon, by removing from the same any surplus ink, and by providing the inked surfaces with a smooth, uniform finish.

The invention relates to various features of organization and construction for carrying the purpose into effect, and it involves among other things a reel, either single or multiplex, for holding one or a number of strips or ribbons of very considerable length, which reel is of novel construction, and from which the strip or strips are fed through a trough or pan containing the inking composition, and means for incorporating it into the strips or ribbon, which means are of novel organization.

The invention further relates to the devices for feeding the inked ribbon or ribbons between moving paper strips which are held with suitable pressure against both surfaces of the ribbon, and to ribbon tension devices, and to a receiving roll, and to other features of construction and organization which will hereinafter be more fully described.

Figure 1:
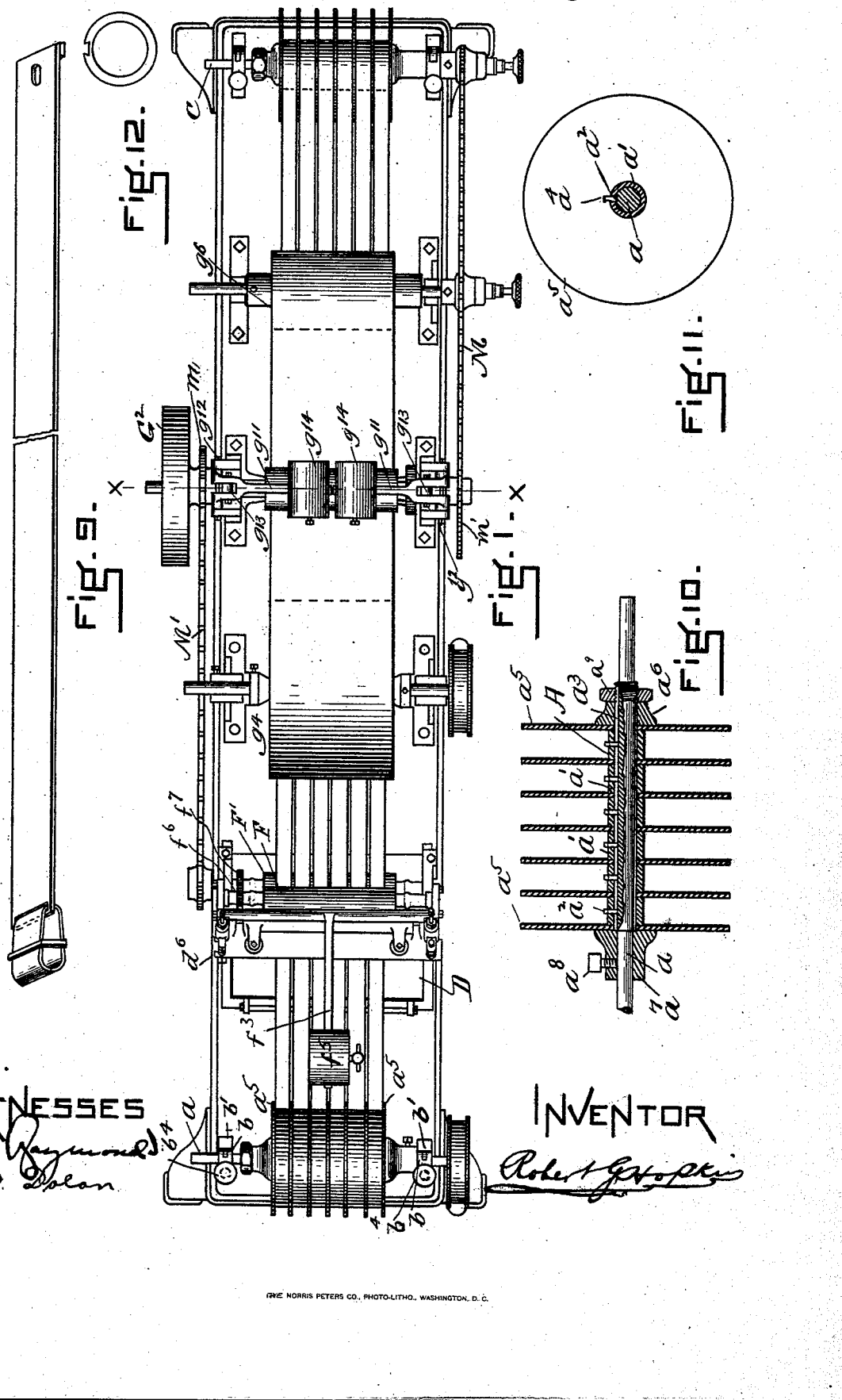
Figure 2:
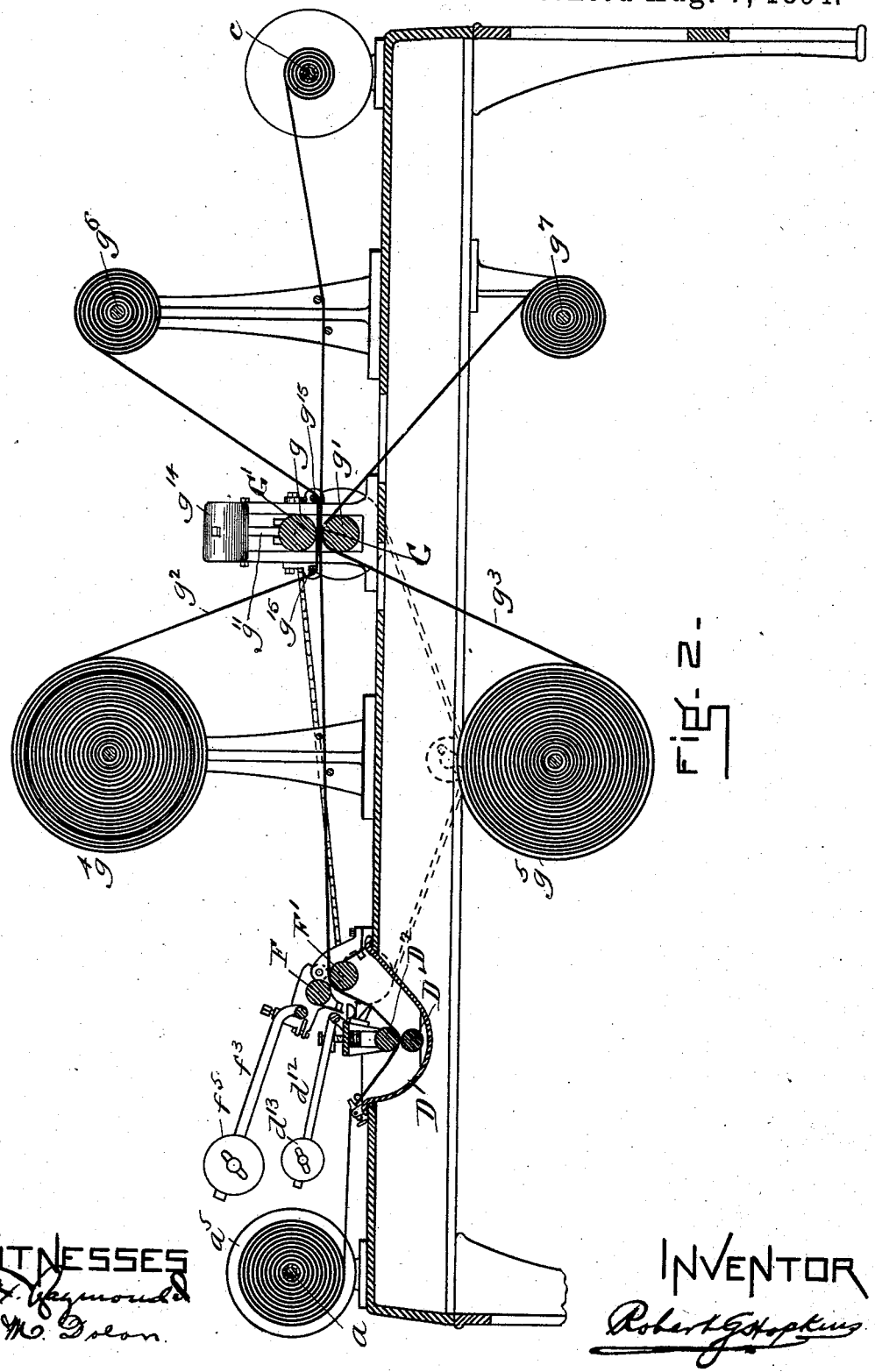
Figure 3:
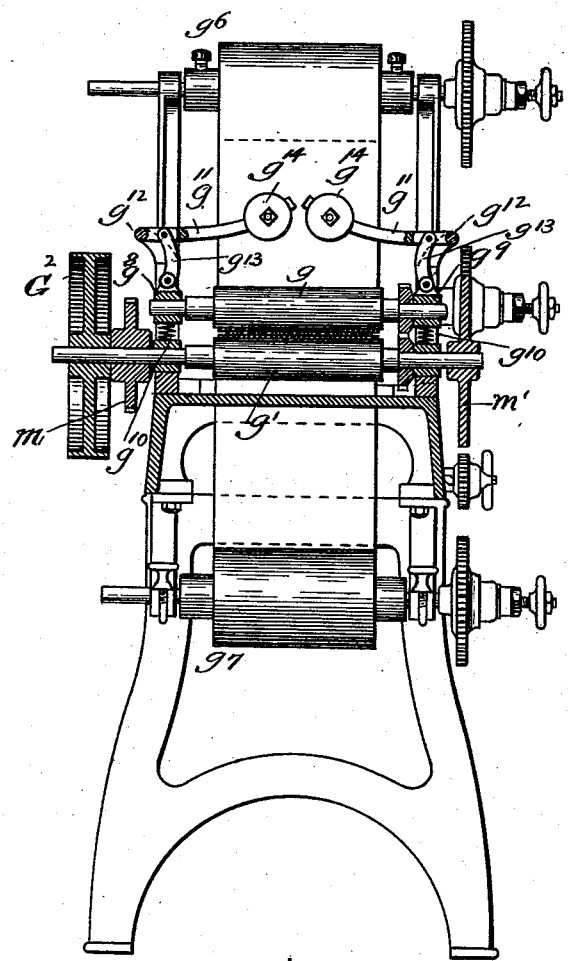

In the drawings, Figure 1 is a view in plan of a machine having the features of my invention. Fig. 2 is a view thereof partly in vertical central section. Fig. 3 is a view in vertical cross-section upon the dotted line $x$—$x$ of Fig. 1. Fig. 4 is a detail view enlarged, representing the inking trough or pan and the ink applying and compressing devices in connection therewith. Fig. 5 is a view illustrating a modified form of the pan and its devices. Fig. 6 is a view principally in end elevation, further showing the inking apparatus, to which reference is hereinafter made. Figs. 7 and 8 are detail views illustrating in section and elevation respectively a tension regulating device for regulating the tension upon the winding shafts. Fig. 9 is a view of a flexible ribbon engaging or connecting and attached to the receiving reel. Fig. 10 is a view in section through the reel from which the uninked ribbons or strips are fed. Fig. 11 is a view representing in elevation a separating or spacing disk upon the reel shaft. Fig. 12 is a view of a ring having a dovetailed block upon the end of the holding strip represented in Fig. 9. Fig. 13 is a view in vertical section, and Fig. 14 in plan of a modified form of the ink holding tray and the incorporating rolls or devices. Fig. 15 is a perspective view of one of the cheek pieces. Fig. 16 is a view showing the same parts as shown in Fig. 4, the upper rolls being represented as turned up. Fig. 17 is a detail in elevation showing shaft bearings.

The machine as shown in Fig. 1 is represented as simultaneously acting on six ribbons, and each of the ribbons is held upon a separate or independent delivery drum and each is wound upon a separate winding or receiving drum.

By separate and independent drums is meant, not that they are separately delivered from and wound upon, but that they are separate from each other, so that they may be independently handled when off from their shafts.

The delivery drums A are mounted upon the shaft $a$. They each comprise a barrel $a'$ arranged to slide upon the shaft, and each has a metal stud $a^2$ which extends through the sleeve, the inner end entering a groove or keyway $a^3$ in the shaft, and the outer end being shaped to form a hook $a^4$ for engaging and holding the inner end of the uninked ribbon.

These sleeves $a'$ are separated from each other by the disks $a^5$ which slip onto the shaft between them, and they are all held against the collar $a^7$ at one end of the shaft $a$ by the removable collar $a^6$ which is held against the disks by the nut $a^9$. The shaft $a$ is held in bearings, the caps $b$ of which are hinged at their ends $b'$ to the lower sections of the box, and are each held in place by a bolt $b^2$ which is also hinged to the lower section of the box and which may be swung into a recess $b^3$ cut into the free end of the cap, and the nut $b^4$ carried by the bolt being turned against the cap fastens it to the box. It will be seen that this affords a very ready means of releasing the shaft from its bearings, as it is simply necessary to unscrew the nuts, turn the bolts outward upon their hinges to release the caps, and then turn the caps upon their hinges in the opposite direction, when the shaft is free to be lifted from its bearings. The same form of bearing and cap is used for holding the winding shaft $c$.

The ribbons pass from the delivery reels through the inking solution held in the tray or pan D. This tray is detachably secured to the bed of the machine and it carries rolls for incorporating the inking composition into the fibers and texture of the ribbons. These rolls may be arranged as represented in Fig. 4, where two are shown in the tray, one above the other, or as represented in Fig. 13 where three are employed.

In some cases, a rod or bar extending across the lower part of the tray and under which the ribbons travel may be employed. Such a construction is represented in Fig. 5. In the construction represented in Fig. 4, D', D² are the incorporating rolls of the tray D. The lower roll D' has stationary bearings in the end pieces $d^2$ of the tray or in supports extending upward from its bottom. The upper roll D² is carried by sliding boxes $d^3$ which have a vertical movement in the box holders $d^4$ extending down from the cross-bar $d^5$, and this cross-bar is hinged at its end $d^6$ to one side of the pan, in order that it may be turned over to lift the upper roll from the under roll and permit the strip to be easily inserted between them, (see Fig. 16,) and it is locked down in horizontal position by the hinged bolt $d^7$ and nut $d^8$ (see Fig. 6). This cross-bar $d^5$ carries a rock shaft $d^9$ pivoted at $d^{10}$ to lugs extending upward from the cross-bar, and having outward extending lugs $d^{11}$ which carry vertically adjustable screws, the lower ends of which bear against springs over the sliding boxes $d^3$ to vary the tension thereon, and the extent of this tension is regulated by the lever $d^{12}$ extending from the rock shaft and the weight $d^{13}$ which is adjustable upon the lever. There is attached to the plate $d^5$ or downward extensions therefrom a scraper E which is vertically adjustable by any suitable means in relation to said plate and over the outer edge of which the ribbons are drawn. The ribbons are likewise drawn over the upper edge of the scraper E' and between the rolls F and F' said scraper E' being supported by its ends suitably attached to the frame nearly under the bearings of the rolls F and F'. The roll F' is supported in bearings preferably open at their top, carried by the cross plate $f$, which is bolted to the bed of the machine, and it and the roll F are preferably arranged over the tray D. The roll F is preferably supported by hinged bearing pieces $f'$ which are hinged at $f^2$ to brackets extending upward from the plate $f$, and this roll is set at any desired tension against the roll F' by means of the lever $f^3$ pivoted at $f^4$ to the bearing pieces $f'$ and carrying the adjustable weight $f^5$. (See Fig. 4.) These rolls are geared together and positively driven. The said gears are indicated at $f^6$, $f^7$ in Fig. 1, and the shaft of the roll F' is driven by a sprocket chain M' from the sprocket $m$ on the shaft of roll $g'$.

Scrapers $e$ and $e'$ may be arranged to bear against the rolls F' F respectively, and a trough $e^2$ may be arranged beneath the scraper $e'$ to receive the scrapings removed from the roll F.

In Fig. 13, the ribbons are represented as running beneath the lower roll D³, then backward and upward around the roll D⁴, then downward beneath the roll D⁵. I consider these rolls, however, the equivalent of the rolls D' and D². In Fig. 13, the rolls D', D² are journaled in the removable cheeks or false pieces D⁶ which are removable from the tray and which are held in place in the tray by a flange $d^7$ near each side of the tray and fastened to its bottom. These flanges are well shown in Fig. 14, and they form narrow recesses for receiving and holding the ends and bottoms of the cheeks D⁶. This construction furnishes a very desirable means for quickly removing the rolls from the tray, the cheeks having the upward extending sections $d^8$ provided with handle holes D⁹, by which they may be simultaneously grasped and lifted with the rolls from the tray. As it is necessary to frequently clean the rolls, this construction is very useful.

The rolls incorporate the inking composition into the ribbon under such pressure and tension as may be required, and the inked ribbons are then passed between the moving finishing surfaces G G'. These surfaces are preferably provided by long strips or webs of paper or other suitable flexible material, and they are held in contact with the surfaces of the ribbons by the rolls $g$ $g'$, the finishing surfaces moving at the same speed as the ribbons, or, if desired, faster than the ribbons or slower than the ribbons. The speed of travel of the finishing surfaces G, G', will depend upon the speed with which the winding rolls $g^6$, $g^7$ are driven.

The strips or webs $g^2$ $g^3$ respectively are carried in the form of rolls $g^4$ $g^5$ both of which are suitably supported. The strip $g^2$ extends under the roll $g$ to the winding roll $g^6$, and the strip $g^3$ extends from the roll $g^5$ over the roll $g'$ to the winding roll $g^7$, the winding rolls being rotated as hereinafter specified.

I am aware that it has been proposed to press fabric and to rub paint into articles, such as whips, by passing such fabric or articles between moving surfaces composed of endless belts; but for the purpose of finishing inked ribbons such endless belts would be impractical because they could not be made of such length as to avoid soon becoming saturated with the ink. By means of my reels or rolls $g^4$, $g^5$, $g^6$ and $g^7$ and the strips $g^2$, $g^3$ wound thereon, I am able to provide finishing surfaces of great length in compact form.

The upper roll $g$ has bearings in the sliding boxes $g^8$ $g^9$ (see Fig. 3) and are pressed downward against springs $g^{10}$ by the levers $g^{11}$ pivoted at $g^{12}$ and connected with the boxes by the links $g^{13}$, and the levers $g^{11}$ bearing the adjustable weights $g^{14}$. The lower roll $g'$ is rotated by means of a pulley $G^2$ and belt, and the upper roll $g$ is connected with the shaft of the lower roll by gears, the teeth of which are of sufficient length so they will not become disengaged when the thickness of the material passing between the rolls varies.

As the upper strip has a tendency to lift the upper roll $g$ when running directly under it as represented in Fig. 2, I prefer to run it under the rods $g^{15}$ arranged upon each side thereof and vertically adjustable, (by any suitable means) the rods taking the lifting strain of the web from the roll. The inked ribbons are then wound on drums carried by the winding shaft $c$, the drums being like those of the delivery roll, and attached to the winding shaft in a similar way, and are separated from each other by disks like the disks $a^5$. Each winding or receiving drum has attached to it an uninked strip of a length sufficient to extend to the inking trough where its end is attached to the ribbon to be inked. In Fig. 9 I have shown such a strip. It is represented as having at its inner end a dovetail piece by which it is secured to the winding drum, the drum having a dove-tail cross-recess to receive the said piece. This construction is used when leading strips of spring metal are employed. I prefer though to use leading strips of cloth.

The winding shaft $c$ and the shafts of the winding reels $g^6$ $g^7$ are turned from the shaft of the roll $g'$ by means of a sprocket chain M running about the sprocket wheel $m'$ on said shaft and about sprocket wheels on each of the reel shafts and the winding shaft, the said sprocket wheels being connected with their respective shafts by a frictional connection which permits the shafts to have a different rate of rotation from that of the sprocket wheels in order that the rotation may be automatically changed as the size of the roll of ribbon and surfacing strips vary from time to time; and I will now describe the construction of this frictional mechanism between the sprocket wheels and the shafts which they turn, a description of one only being necessary, as the three are alike. The construction is well shown in Fig. 7. This slip frictional device comprises a sprocket wheel $o$ free to turn upon the shaft which supports it, excepting so far as it is held upon the same or against the collar $o'$ fast to the shaft by friction; and as it is desirable that the extent or degree of friction should be easily regulated and varied, I prefer to employ for this purpose the construction shown in Fig. 7, where $o^2$ is a flat ring or disk held against the side of the sprocket wheel by the spring $o^3$. This frictional disk or ring is formed at the end of a sleeve $o^4$ which surrounds the hub of the sprocket wheel and the end $o^5$ of the shaft. The spring $o^3$ is held between the sleeve $o^4$ and the cap $o^6$, and this cap is longitudinally adjustable upon the shaft by the nut $o^7$ screwing upon the threaded end $o^8$ of the shaft. By changing the position of this nut, the cap $o^6$ may be moved in or out in relation to the sprocket wheel and the tension of the spring varied.

To withdraw the friction ring $o^2$ from the side of the sprocket wheel and thus relieve it from friction, I have formed in the end of the shaft the hole $o^9$ which extends into a cross-slot or opening $o^{10}$, and in this opening there is a cross-bar or rod $o^{11}$ the ends of which by the outward movement of the rod $o^{14}$ may be brought into contact with the outer end of the sleeve $o^4$ and thus draw the sleeve from the sprocket wheel. This movement is obtained by means of the handle or wheel $o^{12}$, and to lock the friction disk in its outward position, this wheel $o^{12}$ is provided with a dog $o^{13}$ which shuts into a recess $o^{15}$ upon one side of the shaft. (See Fig. 8.)

By bringing the ends of cross-bar or rod $o^{11}$ into contact with the outer end of sleeve $o^4$, as described, the tension of the slip frictional devices may be entirely removed when it is desired to unwind or rapidly re-wind the paper strips which form the finishing surfaces. This removal of the entire tension does not affect the degree of tension which will be exerted when the friction ring $o^2$ is returned to its normal position against the sprocket wheel, it being understood that it is desirable, when once the proper tension for the paper has been obtained, to be able to re-set it after a temporary removal at the same degree as before.

The operation of the machine is as follows: The wound uninked ribbons are placed upon the delivery shaft, the ends attached to leading strips extending from the receiving drums upon the shaft $c$. The machine is started and the ribbons are drawn through the inking composition in the tray or pan and between or about incorporating rolls which are set against the ribbon, or against which the ribbon bears with any suitable tension, and thence between the surfacing strips G G' held against the ribbons by rolls at any desired pressure, and arranged to have a movement with the ribbons, and the ribbons are then wound upon their holding barrels upon the winding shaft $c$.

The gearing between the roll $g'$ and the incorporating roll F' is so proportioned that the surface speed of the roll F' is the same as the surface speed of the roll $g'$, although the roll $g'$ has a greater diameter than the roll F'. This is for the purpose of insuring the same rate of feed to the fabric or strips by both rolls.

Having thus fully described my invention, I claim and desire to secure by Letters Patent of the United States—

1. In a machine for inking ribbons for typewriting machines, the combination of a delivery shaft and one or more drums mounted thereon, an ink tray, incorporating rolls or devices in the tray, a winding shaft and one or more drums for the ribbon mounted on said shaft, and movable finishing surfaces to act upon each surface of the ribbon each finishing surface being composed of a strip of flexible material having its two ends wound upon delivery and receiving rolls or reels, substantially as described.

2. In a machine for inking ribbons for typewriting machines, the combination of a delivery shaft and one or more drums mounted thereon, an ink tray, incorporating rolls or devices in the tray, a winding shaft and one or more drums for the ribbon mounted on said shaft, and movable finishing surfaces to act upon each surface of the ribbon between the tray and the winding shaft, each finishing surface being composed of a strip of flexible material having its ends wound upon delivery and receiving rolls or reels, and means for holding portions of said finishing surfaces against the ribbon with a yielding pressure, substantially as described.

3. The combination in a machine of the character specified of the inking tray, the roll $D^2$, the hinged cross-bar $d^5$, the rock shaft $d^9$ carried thereby, the adjustable bearing screws carried thereby, its pressure regulating devices, the movable roll boxes $d^3$ and the interposed springs, as and for the purposes described.

4. In a machine of the character specified, the combination of the inking apparatus, the winding shaft, the roll $g'$, the vertical yielding roll $g$, the strip delivery rolls $g^4$ $g^5$, and the receiving rolls $g^6$ $g^7$ and the surfacing strips $g^2$ $g^3$, as and for the purposes described.

5. The combination in a machine of the character specified, of the ribbon winding roll shaft, and the shafts of the strip receiving rolls $g^6$, $g^7$, each shaft having a gear or sprocket frictionally connected therewith, means for varying and entirely removing the frictional connection and means for uniformly rotating the three gears or sprockets, substantially as described.

ROBERT G. HOPKINS.

In presence of—
F. F. RAYMOND, 2d,
J. M. DOLAN.